April 27, 1943.　　　T. R. JAMES　　　2,317,532
PROCESS FOR TOASTING FLAKED CEREAL AND THE LIKE
Original Filed Aug. 2, 1940　　　7 Sheets-Sheet 6
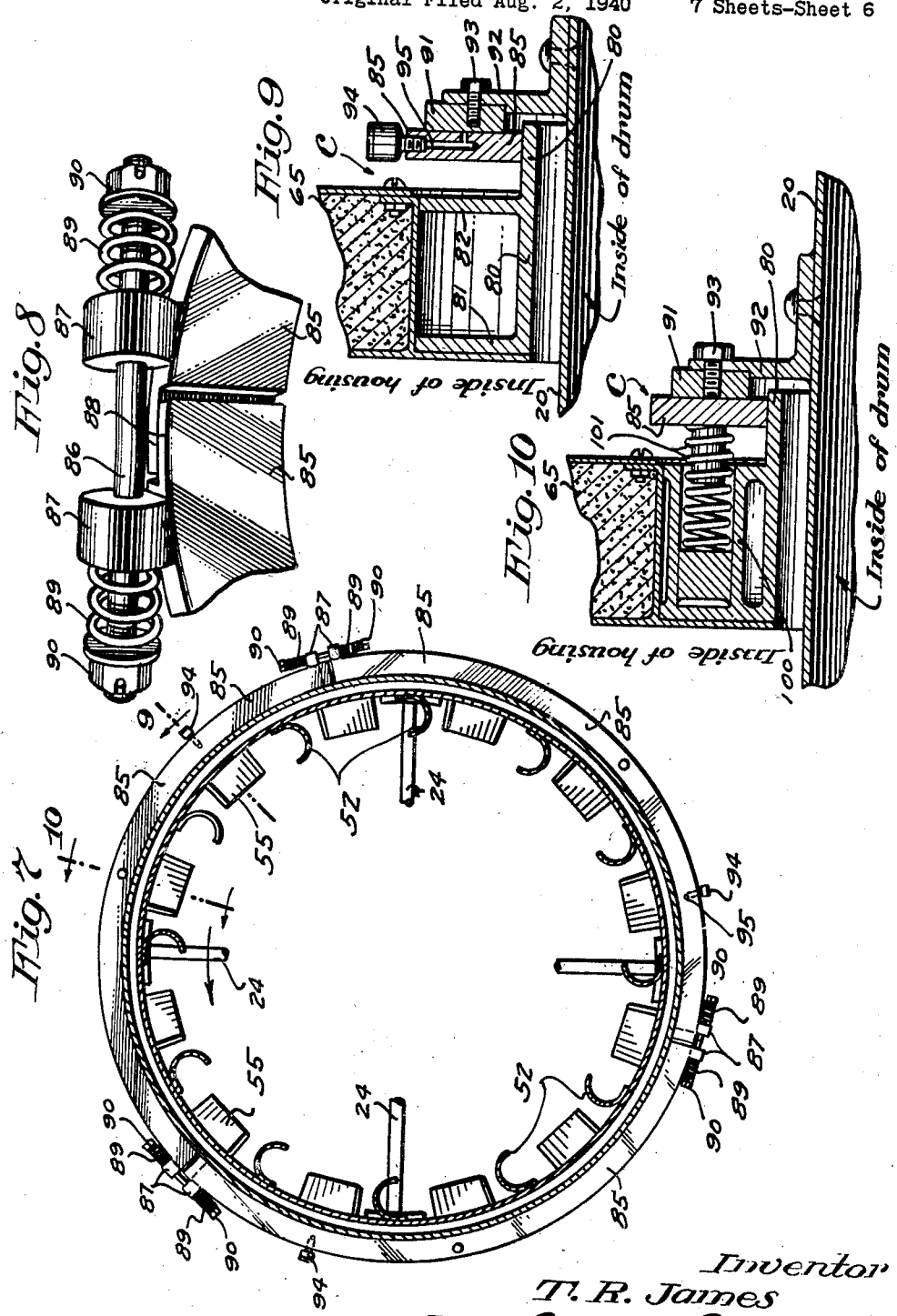
Inventor
T. R. James
By Arthur R. Wyke
Atty.

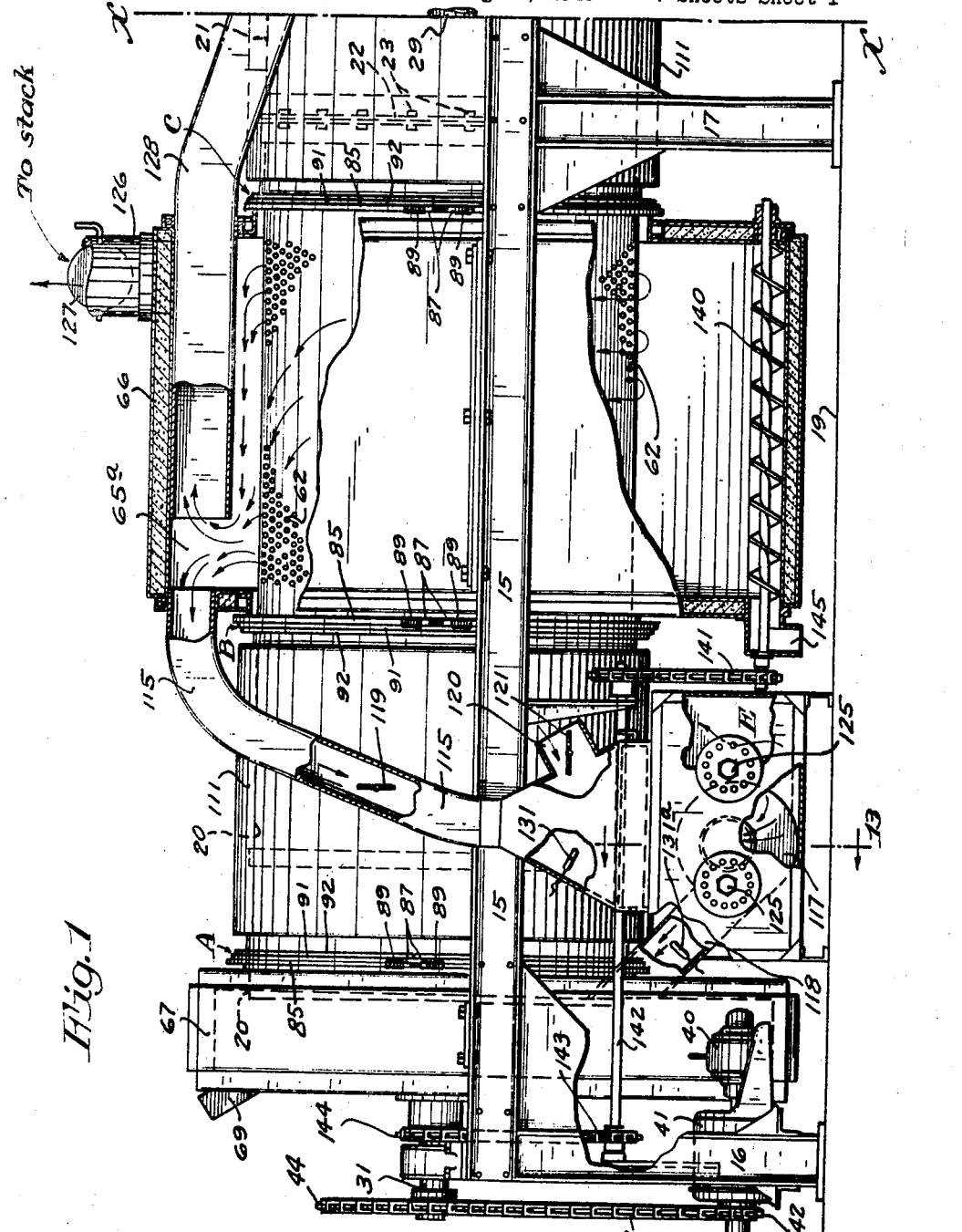

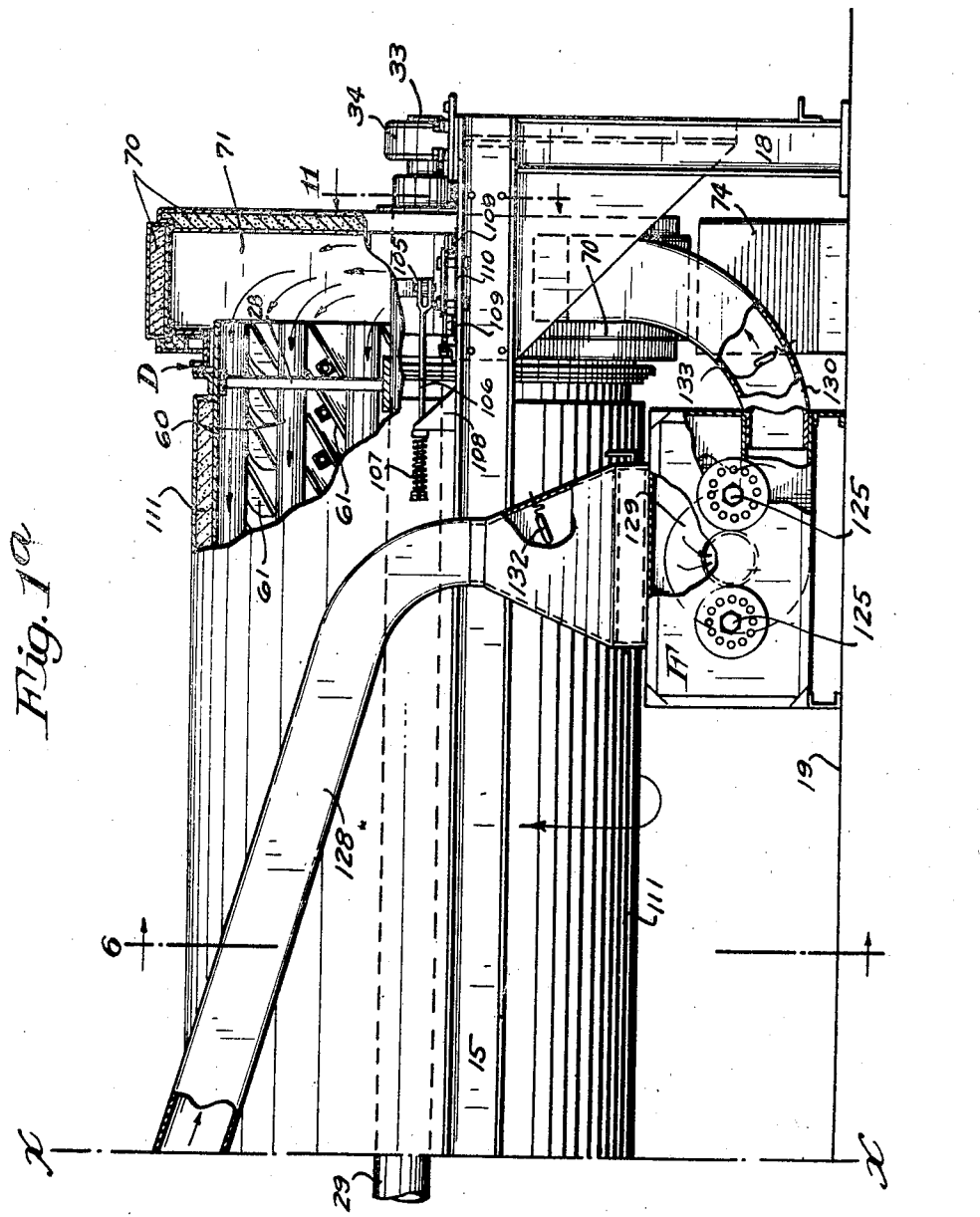

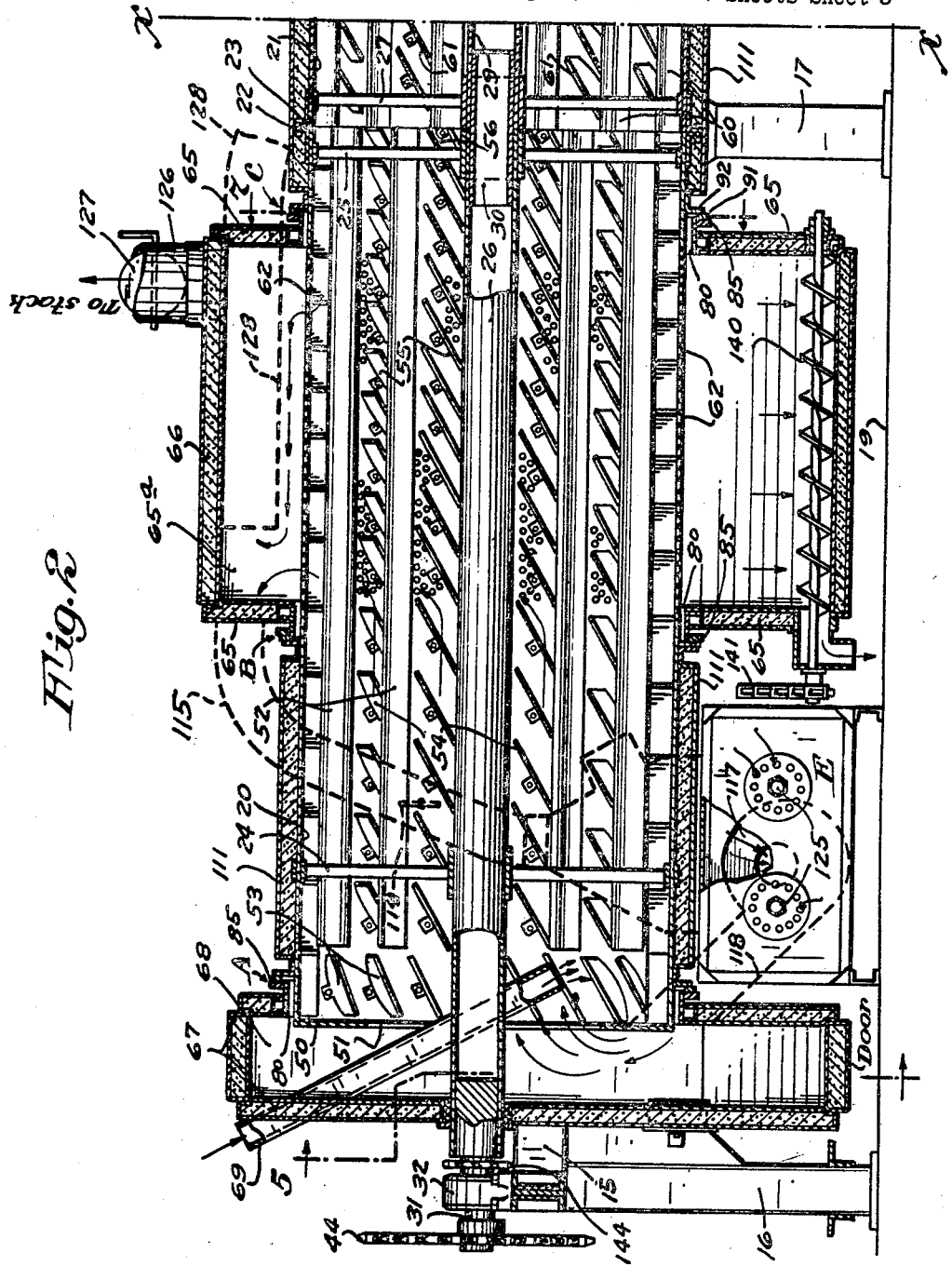

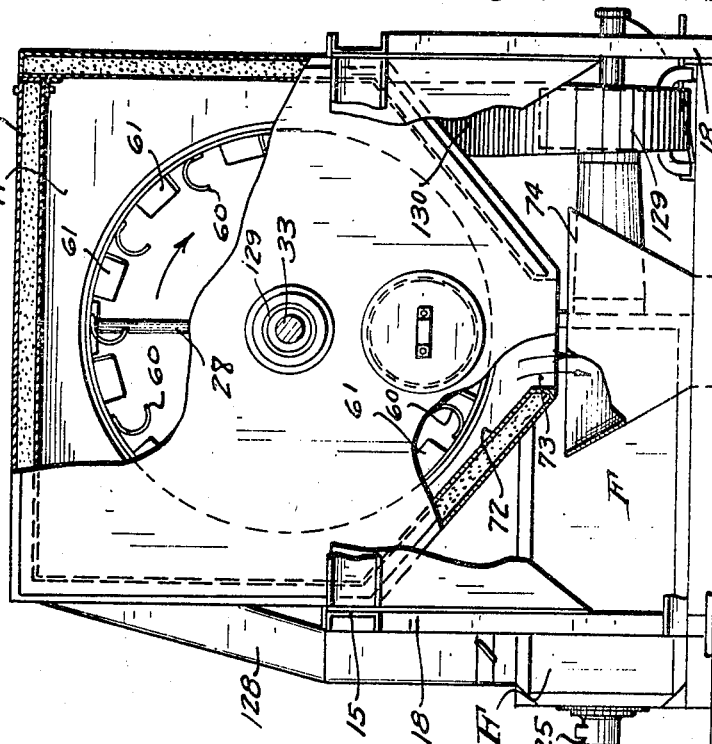
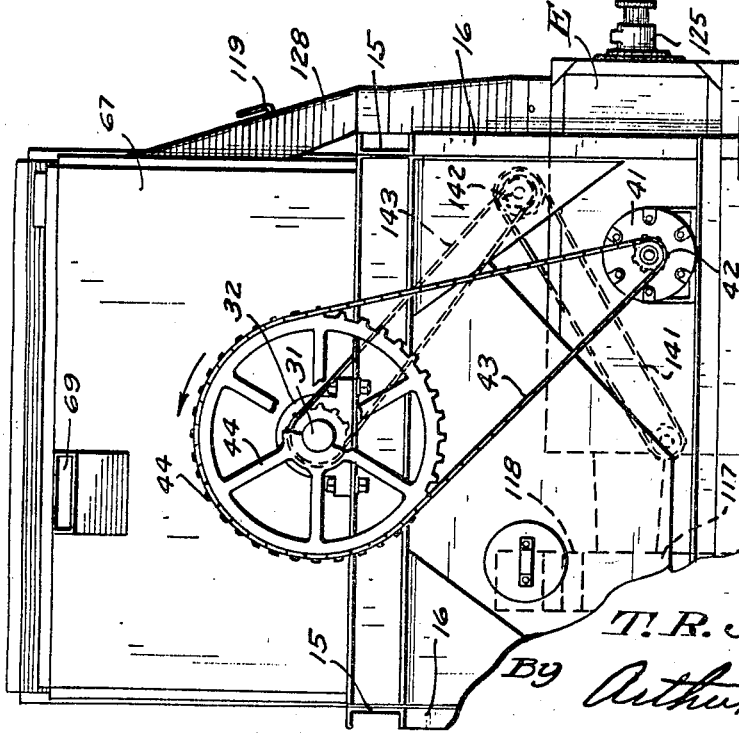

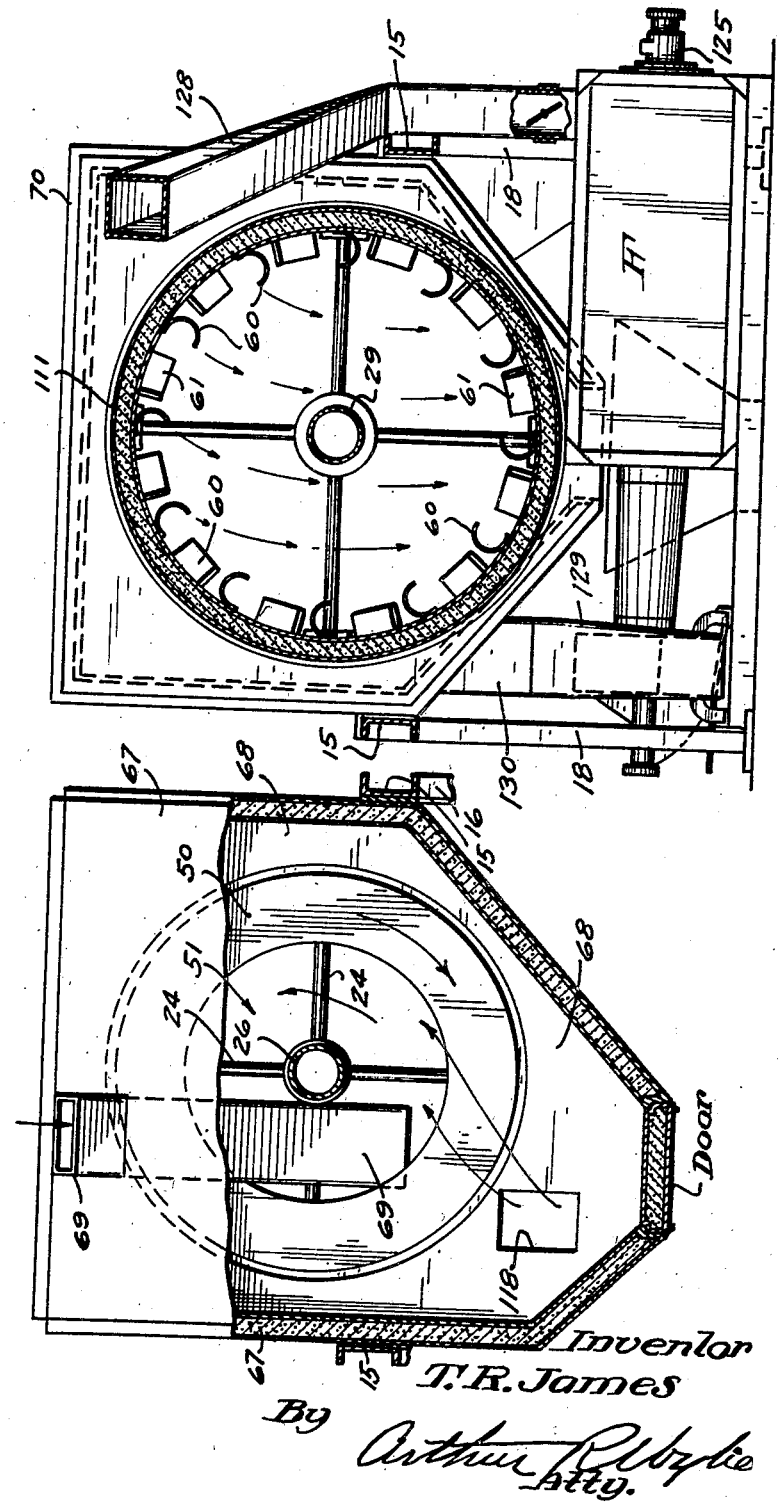

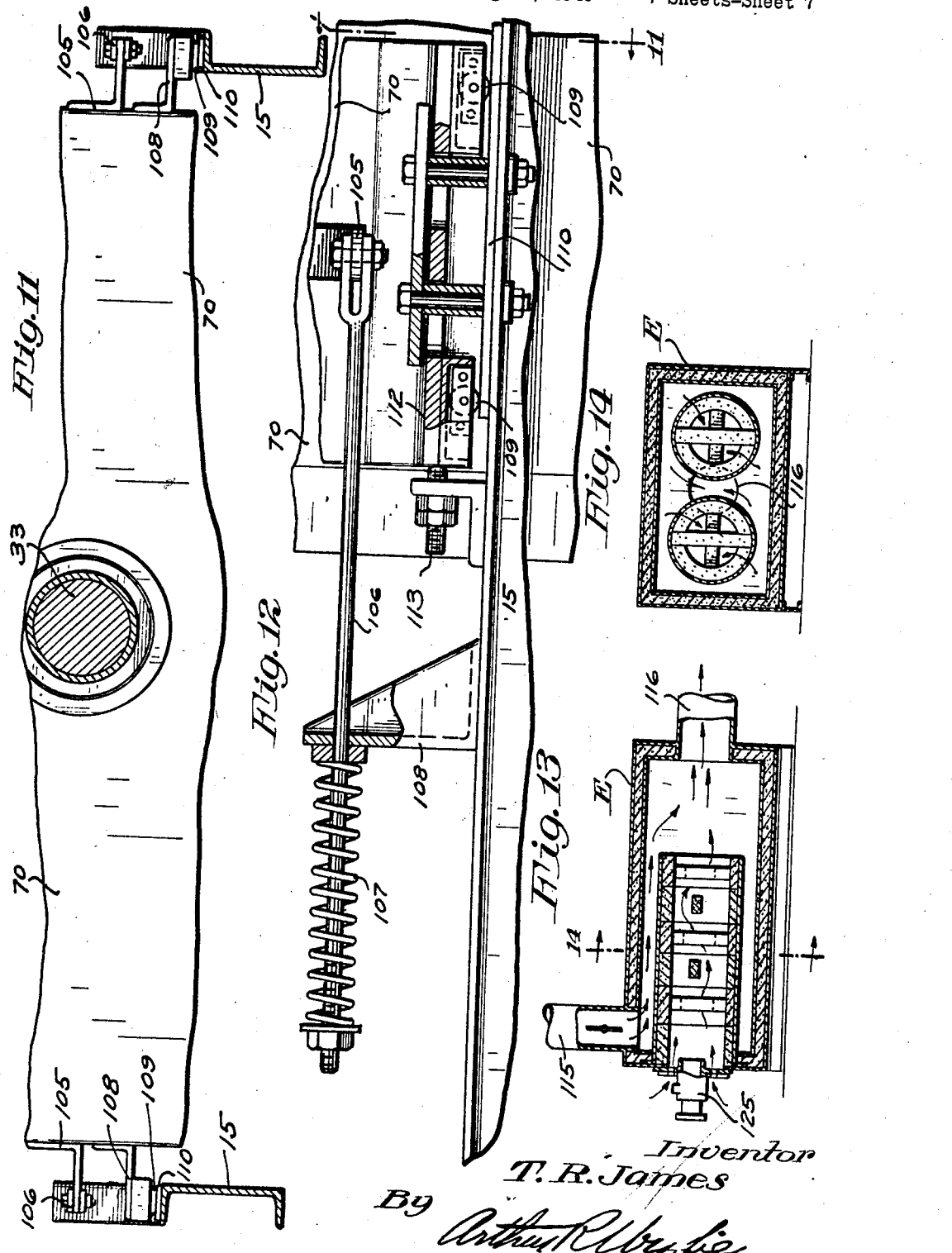

Patented Apr. 27, 1943

2,317,532

UNITED STATES PATENT OFFICE 2,317,532

PROCESS FOR TOASTING FLAKED CEREAL AND THE LIKE

Thomas R. James, Minneapolis, Minn., assignor to General Mills, Inc., a corporation of Delaware Original application August 2, 1940, Serial No. 349,822. Divided and this application July 18, 1941, Serial No. 403,050

4 Claims. (Cl. 99—80)

An object of this invention is to provide a ready and efficient process for drying and toasting a cereal of the flaked type.

Cereals of this type on leaving the flaking rolls carry a high percentage of moisture—about 18% by weight. The process embodying this invention serves to remove most of this moisture and to toast the flakes under controlled conditions.

Another object is the provision of a process for removing much of the dust from the cereal during the drying process.

These and other objects as will hereinafter appear are accomplished by this invention which is fully described in the following specification and shown in the accompanying drawings in which:

Figure 1 is a side elevation partly in section of the left-hand end of an oven embodying the invention;

Figure 1ᵃ is a similar view of the right-hand end of the machine;

Fig. 2 is a vertical longitudinal section through the left-hand end of the machine;

Fig. 3 is an end elevation of the left-hand or entering end of the machine;

Fig. 4 is an end elevation of the right-hand or discharge end of the machine;

Fig. 5 is a section on the broken line 5—5 of Fig. 2;

Fig. 6 is a vertical section on the line 6—6 of Fig. 1ᵃ;

Fig. 7 is an enlarged section on the line 7—7 of Fig. 2;

Fig. 8 is a partial enlarged detail of the tension springs of Fig. 7;

Figs. 9 and 10 are partial enlarged sections on the lines 9 and 10 of Fig. 7;

Fig. 11 is a partial enlarged section on the line 11—11 of Figs. 1ᵃ and 12;

Fig. 12 is a partial enlarged detail of the right-hand end of the drum mounting of Fig. 1ᵃ;

Fig. 13 is a partial vertical section on the line 13—13 of Fig. 1; and

Fig. 14 is a transverse section on the line 14—14 of Fig. 15.

This is a division of my application Serial No. 349,822, filed August 2, 1940.

The embodiment illustrated comprises a main frame having side channels 15 supported on legs 16, 17, 18, which rest upon a floor 19.

A rotatable steel drum is made up of two sections 20, 21 secured together by meeting flanges 22 and bolts 23. The section 20 has spiders 24, 25 by means of which it is mounted upon a hollow tubular shaft 26 while the drum section 21 is similarly mounted on spiders 27, 28 on a hollow tubular shaft 29, the tubular shafts 26 and 29 being aligned and secured together by an internal sleeve 30. The hollow shaft 26 has a stub shaft 31 secured in its left-hand end, as shown in Fig. 2 and this is journalled in a bearing 32. The hollow shaft 29 similarly has a stub shaft 33 secured in the opposite end and this is journalled in a suitable bearing 34. This arrangement of shafts with their drum sections mounted thereon by means of spiders provides a very light but rigid arrangement so that there is relatively little deflection in the shafts in spite of their very considerable length. This drum, through its shaft, is driven by means of a motor 40 (Fig. 1) acting through a suitable gear reduction 41, a sprocket 42 and chain 43 to a sprocket 44 on stub shaft 31.

The left-hand drum section 20, as shown in Fig. 2, is partially closed at the entering end by means of a disk 50 having a central opening 51. Each of the drum sections is provided with a series of longitudinal buckets 52, as shown in cross section in Fig. 7, which served to pick up the material to be treated and to drop through the drum as the latter revolves as shown by arrows in Fig. 6, thereby bringing it intimately in contact with the moving currents of air as will later be described. These buckets preferably stop a little short of the left-hand end of the drum, as shown in Fig. 2, to accommodate a series of flights 53. Other series of flights 54, 55 and 56 are located between these longitudinal buckets to propel the material acted upon from entering into the discharge end of the drum, as will presently be explained. Similarly, the drum section 21 is provided with buckets 60 and with flights 61 spaced therebetween, as shown in Figs. 1ᵃ and 6. The drum section 20 is provided with a series of small drilled holes 62 to provide egress for the heated air as well as for any fine dust which will be carried out by the air currents during the drying and toasting process.

That portion of the drum section 20 occupied by the hole 62 is inclosed by a stationary housing made up of end walls 65 and side walls 66. These members are made hollow and are filled with a suitable heat insulator as shown. The entering in of the drum is inclosed with similarly insulated sections 67 to provide a passage 68 of the entrance of the hot air. A chute 69 extends diagonally across this space and entering into the drum and this chute is adapted to carry the flaked cereal or other material to be treated as by drying and toasting.

Referring to Figs. 1ᵃ and 4, the discharge end of the drum is inclosed by the stationary housing 70 to provide a passage 71 to which the material treated is propelled. The walls of the bottom of this passage are inclined at 72 and are provided with an opening 73, for discharge of the material into a suitable hopper 74 which guides the material to a conveyor belt or other suitable means for handling the toasted cereal.

A suitable rotatable connection is provided between the drum and these stationary housings at the points A, B and C of Fig. 1 and D of Fig. 1a. These connections are all similar and are shown in detail in Figs. 7 to 10, inclusive. A description of the connection C will serve for all.

Thus the housing 65 is provided with a stationary ledge 80 having annular flanges 81, 82 welded thereto and to the member 65 so that the ledge 80 is concentric with the axis of the drum. A solid bearing ring 85 is made up preferably in three sections, as shown in Fig. 7, which are yieldably secured together by means of bolts 86 passing through bosses 87, the ends of the rings being rabbeted at 88 where they pass each other. These sections are urged toward each other by means of springs 89 and bolts 90 so that the ring 85 closely grips the ledge 80.

Referring to Fig. 10, the stationary member 65 also carries a tube 100 in which is located a spring 101 which presses the ring 85 against the bearing member 91. The springs 101 are spaced at intervals about the ring.

A bronze bearing ring 91 is secured to annular flange 92 by means of cap screws 93. The flange 92 is secured to the drum by means of rivets. An oil cup, or the like, 94 is carried by the ring 85 which has an oil hole 95 arranged to carry oil to the ring 91. Thus a simple and efficient sliding connection is provided between the drum and the stationary member 65 which is substantially airtight. There is some slip between the members 80 and 85 and oil from the oil cups working down along the side of the ring 85 sufficiently lubricates these members.

In order to provide for the unequal expansion of the drum and of its supporting frame, the shaft of the drum is journalled in the bearing 32 (Fig. 2) and permits for the expansion of the drum at the right-hand end, as shown in Figs. 1a, 11 and 12. In this the housing 70 is movable forward and back with the drum and has a lug 105 at each side connected to a rod 106 which passes through a spring 107, the latter bearing against a bracket 108 on the frame 15. Thus the springs 107 at each side keep the housing 70 drawn up against the bronze bearing ring 91. The housing 70 is carried on supports 112 which bear on rollers 109 which take a bearing on plates 110 on the side frame members 15. The drums are covered with suitable insulation 111. Screws 113 are adjusted to contact the supports 112 when the oven is at room temperature.

The method of heating the air for the oven will now be described. It consists essentially of two air heaters E and F (Figs. 1 and 1a) which are disposed beneath the oven. The intake to the oven E consists of a pipe 115 which draws air from the top of the dust chamber 65a and passes it through a pipe 116 (Fig. 13) to the intake of a fan 117 (Fig. 1) which delivers through a pipe 118 to the sapce 68 at the intake end of the oven. A damper 119 is provided in the pipe 115 and an air inlet 120 is provided with a damper 121 for introducing room air into the heater.

This heater is also provided with a suitable gas burner 125 (Fig. 13) by means of which a jet of heated air is introduced into the heater, the products of combustion mixing with the air and passing through the fan into the space 68 from which it flows into the inlet end of the oven. It passes through the holes 62 into the duts collector 65a and back through the pipe 115 to the heater. The dust collector connects through a pipe 126 to a stack, a damper 127 in this pipe serving to control the outflow of gases. The heater F is similar to the heater E and has a pipe 128 leading thereto from the dust chamber 65a. After being heated, the hot air is delivered by a fan 129 to a pipe 130 which forces it into the housing space 71 at the delivery end of the oven.

The fan 117 is designed to deliver approximately three times as much air as the fan 129 and the heater E is set to deliver this air at a temperature of approximately 600° F. while the heater F delivers air at a temperature of approximately 750° F. for one type of flaked cereal. By this arrangement the cereal which, when received from the flaking rolls contains about 18% of moisture, is very rapidly heated, as it is propelled slowly by the flights 54 and a very large percentage of its moisture is quickly removed. This material delivered by the chute 69 is rapidly moved to the flights 54 by flights 53. As it then passes the flights 55 over the holes 62 it loses most of its remaining moisture so that by the time it reaches the flights 61 it has largely been dried and is ready for toasting. This toasting action is preferably done with air passing through this portion of the oven at a relatively slow rate but the cereal itself is moved rapidly during this last portion of the operation by the flights 61, the flights 55 giving the material a rate of flow between that of flights 54 and 61.

The temperature of the incoming air in the pipe 115 is indicated by a thermometer 131 and that of the outgoing air by a thermometer 131a. Likewise thermometers 132 and 133 indicate the temperatures of the air passing to and from the heater F. By following these indications and by manipulating the various controls, the operator is able to maintain the speed of the drying and toasting operations to a very high degree.

As has been indicated before, the fine dust generated in the oven is carried back and finds its way through the holes 62 into the dust collector where it drops to the bottom and is propelled by means of a screw 140 driven by sprockets and a chain 141 from a shaft 142 which in turn is driven by a chain 143 from a sprocket 144 on the shaft 31. This dust is slowly propelled toward the opening 145 where it drops into a suitable receiver.

Thus it will be seen that I have provided a very simple and efficient type of oven for drying and toasting flaked cereals and the like and one which requires a minimum amount of attention to keep it operating successfully.

While I have shown and described but a single embodiment of my invention, it is to be understood that it is capable of many modifications. Changes, therefore, may be made which do not depart from the spirit and scope of my invention as disclosed in the appended claims.

I claim as my invention:

1. The process of drying and toasting a flaked cereal comprising directing the cereal through a rotating drum, passing heated air into the two ends of the drum, withdrawing air from the middle of the drum, rotating said drum so as to drop the cereal through the moving air, and removing dust from the middle of the drum.

2. The process of drying and toasting a flaked cereal comprising passing the cereal continuously through a rotating drum, directing heated air into the two ends of the drum, withdrawing air from the middle of the drum, rotating said drum so as to drop the cereal through the moving air, and removing dust from the middle of the drum.

3. The process of drying and toasting a flaked cereal comprising directing the cereal through a rotating drum, passing heated air into the two ends of the drum, withdrawing air from the middle of the drum, and rotating said drum so as to drop the cereal through the moving air, and removing dust from the middle of the drum the air passing through the entering end of the drum being hotter than the air passing through the delivery end.

4. The process of drying and toasting a flaked cereal comprising directing the cereal through a rotating drum, passing heated air into the two ends of the drum, withdrawing air from the middle of the drum, and rotating said drum so as to drop the cereal through the moving air, and removing dust from the middle of the drum the air passing through the entering end of the drum being hotter and moving faster than the air passing through the delivery end.

THOMAS R. JAMES.